Feb. 24, 1925.
C. W. HANSELL
1,527,646
SPEED REGULATING SYSTEM
Filed March 26, 1924
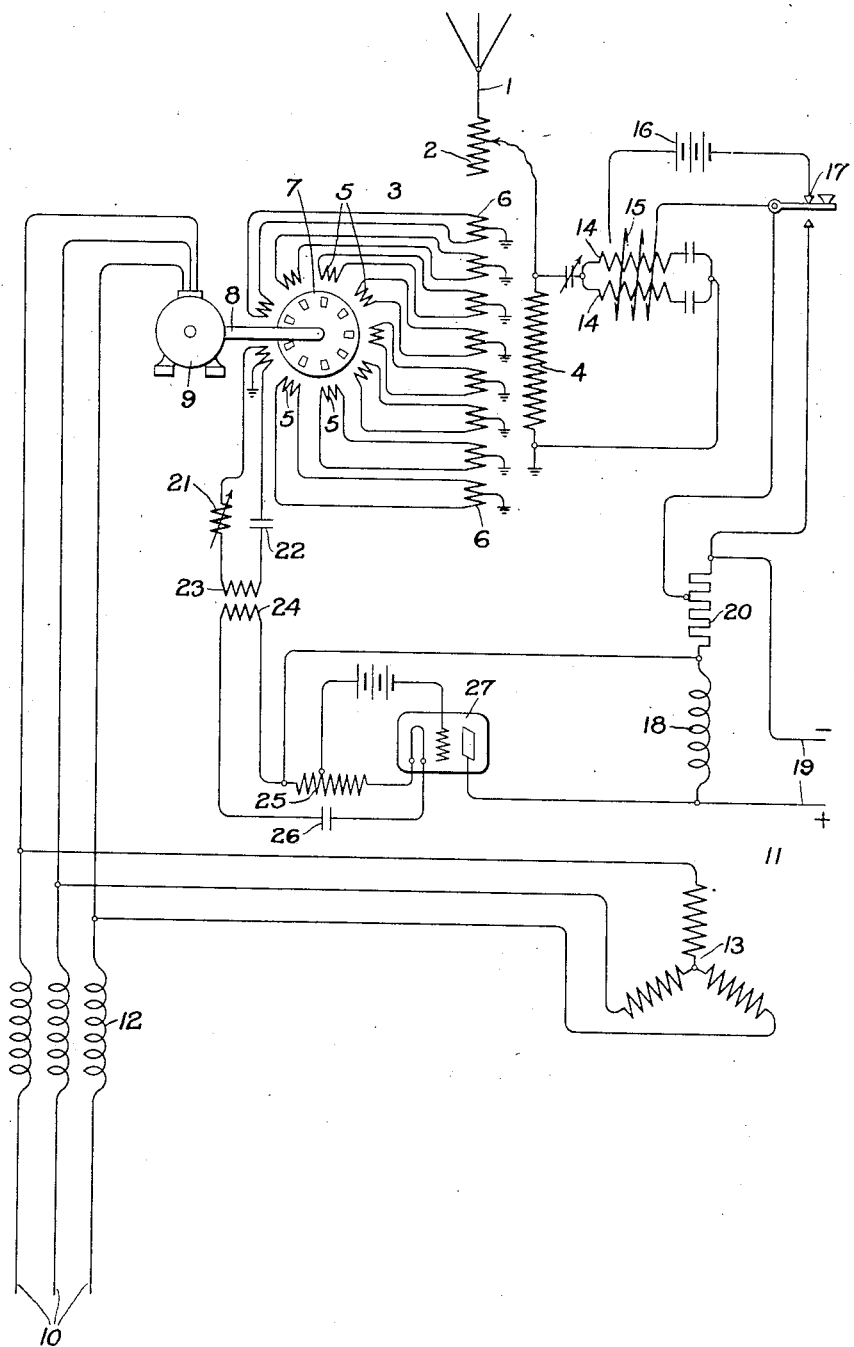
Inventor:
Clarence W. Hansell,
by *[signature]*
His Attorney.

Patented Feb. 24, 1925.

1,527,646

UNITED STATES PATENT OFFICE.

CLARENCE W. HANSELL, OF NEW YORK, N. Y., ASSIGNOR TO GENERAL ELECTRIC COMPANY, A CORPORATION OF NEW YORK.

SPEED-REGULATING SYSTEM.

Application filed March 26, 1924. Serial No. 702,144.

*To all whom it may concern:*

Be it known that I, CLARENCE W. HANSELL, a citizen of the United States, residing at New York, in the county of New York, State of New York, have invented certain new and useful Improvements in Speed-Regulating Systems, of which the following is a specification.

My invention relates to regulating means for maintaining at a predetermined value the speed of an alternating current generator, and has for its object the provision of an improved means for regulating the speed of such a generator in response to change in the frequency of the current which it delivers.

United States Letters Patent to Ernst F. W. Alexanderson, No. 1,400,847, discloses a speed control system comprising an alternator driven by an electric motor. For the purpose of regulating the speed of this motor a resonant circuit supplied with current from the alternator is utilized to control the excitation of a saturation generator from which current is supplied to a saturation regulator connected in the supply leads of the motor for the purpose of controlling its speed. Under these conditions slight increases in the frequency of the alternator load current are immediately utilized to reduce the motor speed and slight decreases in the frequency of this current are likewise utilized to increase the motor speed. In this manner the speed variations of the motor-generator set are maintained within very narrow limits. In accordance with my invention the necessity of using a saturation regulator is avoided and the saturation generator is replaced by a phase modifying device such as a synchronous condenser having its excitation controlled through a resonant circuit in response to change in the frequency of the alternator load current. With this arrangement reactors of any convenient form may be connected in the motor supply line and the amount of current delivered through these reactors, and consequently the voltage impressed on the motor, is regulated in accordance with the power factor at which current is supplied to the motor.

My invention will be better understood from the following description when considered in connection with the accompanying drawing, and its scope will be pointed out in the appended claims.

For the purpose of explaining my invention, I have illustrated it in the accompanying drawing as utilized in connection with a system of radio communication comprising the usual antenna 1 with a tuning inductance 2. The antenna is connected to the armature winding of a radio frequency alternator 3 through a radio transformer having a secondary winding 4. The armature of the alternator 3 has a plurality of coils 5 independently connected to a plurality of primary coils 6 supplying current to the secondary 4 of the transformer. The secondary winding 4 of the transformer is in series with the tuning coil 2 and the antenna 1, and has one terminal connected to ground in the well known manner. The radio frequency alternator, which I have diagrammatically represented in the drawing, is of the inductor type described in U. S. Letters Patent to Ernst F. W. Alexanderson, No. 1,008,577, November 14, 1911, No. 1,110,029, September 8, 1914, and No. 1,110,030, September 8, 1914. The alternator has a stationary laminated iron armature member carrying the coils 5, and has a rotatably mounted rotor or inductor member in the shape of a disk designed for maximum strength and having a plurality of slots for producing magnetic poles therebetween. The inductor rotor of the alternator is represented in the drawing at 7 and is mounted on a rotatable shaft 8. A three-phase alternating current motor 9 is also coupled to the shaft 8 and operates to drive the inductor 7 of the alternator. The motor 9 receives power from the supply conductors 10. The current supplied to the motor 9 is controlled by the synchronous condenser 11 acting in conjunction with the reactors 12 through which the motor 9 is connected to the source represented by the lines 10. The operation of the condenser 11 and reactor 12 will be described in detail later.

The supply of power from the high frequency alternator to the antenna, and hence the energy radiated from the antenna, is controlled by a magnetic controller or amplifier. This magnetic amplifier is of the type described in the Letters Patent of the United States of James C. Armor, No. 1,219,215, while the particular form of the controller which may be used, may be of the type described at length in Letters Patent of the United States, to Ernst F. W. Alexanderson, Nos. 1,328,797 and 1,334,126.

In the circuit connection here illustrated the magnetic amplifier comprises two reactive windings 14, wound upon separate magnetic cores so that their magnetic actions are relatively opposed. The two reactive windings 14 are surrounded by a controlling winding 15 adapted to be supplied with direct current from any suitable source such as a battery 16. The reactive windings 14 are connected in shunt relation to the secondary winding of the transformer 4. A telegraph key 17 controls the flow of current in the winding 15. When the telegraph key 17 is in the position shown in the drawings the controlling winding 15 is energized and the impedance of the reactive windings 14 is a minimum so that the secondary winding 4 is substantially short-circuited and little or no energy is radiated from the antenna 1. When it is desired to send a signal, telegraph key 17 is depressed, thereby opening the circuit of the controlling winding 15, whereupon the impedance of the reactive windings 14 is raised to its maximum value and energy is radiated from the antenna. The alternator is thus loaded and unloaded by operation of the telegraph key.

The speed regulator for the alternator should act in such a way that the power of the motor 9 is changed with the telegraph signals so that the torque of the motor is varied an amount corresponding to the load on the alternator before an appreciable change in speed of the generating unit has taken place.

The voltage drop across the reactors is dependent upon the power factor at which current is supplied to the motor 9 from the source 10. Any suitable phase modifying means arranged to control this voltage drop, and consequently the value of the current delivered to the motor, in response to the frequency of the generator current may be provided. I have shown the synchronous condenser 11 as utilized for this purpose. This condenser is provided with an armature winding 13 and a field winding 18. Exciting current is supplied to the winding 18 from a direct current source 19 through a field resistor 20, a part of which is arranged to be short-circuited by depression of the key 17. When the key 17 is depressed to send a signal, a part of the resistance 20 is short-circuited and the excitation of the condenser 11 is increased. Due to this increase in excitation, the power factor at which current is delivered to the motor 9 is increased, the voltage drop across the reactors 12 is decreased and the torque of the motor is increased to correspond approximately with the change in the load of the alternator 3.

The tuned circuit of the automatic speed regulating mechanism is fed from one of the independent armature circuits of the alternator, and the voltage supplied thereto is thereby rendered independent of the load on the machine. This circuit includes an adjustable inductance 21 for tuning purposes, a condenser 22 and the primary 23 of a transformer. The secondary winding 24 of this transformer is connected in a circuit comprising the reactor 25, the condenser 26 and the filament of a pliotron 27. The regulator can be adjusted for different speeds and corresponding frequencies by changing the inductance of the coil 21 in the tuned circuit. This change can obviously also be made by changing the capacity of the circuit or by changing both capacity and inductance. Variations in the adjustment may also be accomplished if desired by varying the coupling between the primary 23 and the secondary 24 of the transformer which supplies energy to the pliotron circuit. The synchronous condenser field coil 18 is connected in a series circuit comprising the pliotron 27 and the reactor 25.

The resonant circuit which supplies current to the pliotron 27 is preferably adjusted for a frequency slightly higher than that at which the alternator is intended to operate and advantage is taken of the high voltage drop across the reactor 25 to produce a voltage drop, the value of which is dependent upon the frequency of the alternator. This voltage drop is applied to the series circuit comprising the pliotron 27 and field coil 18 in such a way as to oppose the voltage impressed on the coil 18 by the source 19. The resultant field voltage of the condenser and the excitation of the synchronous condenser 11 are therefore dependent on the frequency of the alternator. Since the voltage of the source 10 is practically constant, the voltage impressed on the motor 9 and the speed at which this motor must operate to produce a given torque may be altered by changing the voltage drop across the reactors 12. This change in voltage drop is readily produced through variations in the load current of the condenser 11. The resonant circuit, the condenser and the reactors may thus be used to regulate the voltage impressed on the motor 9 or, in other words, to regulate its speed-torque characteristic in accordance with the frequency of alternator current. As a result of this arrangement, a slight increase in the speed of the alternator 3 will produce a decrease in the excitation of condenser 11 and the speed of the motor 9 will be correspondingly decreased by reason of the fact that the voltage drop of the reactors 12 is increased. If the speed of the alternator 3 decreases slightly, this change is immediately followed by an increase in the excitation of the condenser 11 and consequently in the power factor at which current is delivered to the motor. Any variation of the alternator speed, therefore, immediately brings into operation a force tending to restore it to its normal value and the frequency of the current which the alternator delivers is maintained practically constant.

I have explained my invention by illustrating and describing a certain specific embodiment thereof, but it will be readily understood by those skilled in the art that the invention is not limited to a system of radio communication. It will also be apparent that the pliotron may be replaced by any suitable means for controlling the excitation of the condenser in accordance with the current supplied through the resonant circuit.

What I claim as new and desire to secure by Letters Patent of the United States, is:—

1. A speed regulating system wherein a motor for driving an alternating current generator is arranged to be energized from a source of alternating current and wherein means are provided for deriving from said generator an electric current having its value determined by the frequency of the current delivered by said generator, comprising voltage control means connected to said source in series with said motor, and a phase modifying device controlled in response to the frequency of said generator current and connected to said voltage control means in parallel with said motor.

2. A speed regulating system comprising an alternating current generator, a motor for driving said generator, a source for supplying current to said motor, means associated with said generator for producing a voltage of a value dependent upon the frequency of the generator load current, means for controlling the current supplied to said motor from said source, and phase modifying means responsive to said voltage and operatively associated with said control means for regulating the value of the current supplied to said motor from said source in accordance with the frequency of said generator load current.

3. A speed regulating system wherein a motor for driving an alternating current generator is arranged to be energized from a source of alternating current and wherein means are provided for deriving from said generator a unidirectional current having its value determined by the frequency of the generator current, comprising means for controlling the voltage impressed on said motor by said source, and a synchronous condenser excited in accordance with the value of said direct current and associated with said voltage control means to regulate the phase of the current supplied from said source to said motor in accordance with the value of said direct current.

4. A speed regulating system wherein a motor for driving an alternating current generator is arranged to be energized from a source of alternating current and wherein means are provided for deriving from said generator an electric current having its value determined by the frequency of the generator current, comprising reactors for controlling the impressed voltage of said motor in accordance with the phase of the current supplied from said source to said motor, and a synchronous machine having its excitation controlled in accordance with the value of said electric curernt for controlling the phase of the current supplied to said motor.

5. A speed regulating system wherein a motor for driving an alternating current generator is arranged to be energized from a source of alternating current and wherein means are provided for deriving from said generator a unidirectional current having its value determined by the frequency of the generator current, comprising means for controlling the voltage impressed on said motor by said source in accordance with power factor at which current is delivered from said source to said motor, a dynamo electric machine including a field winding and an armature winding connected to said control means in parallel with said motor, and means for varying the current in said field winding in accordance with the value of said unidirectional current.

6. A speed regulating system wherein a motor for driving an alternating current generator is arranged to be energized from a source of alternating current, comprising means for controlling the voltage impressed on said motor by said source, a machine provided with a field winding and an armature winding conductively associated with said motor and connected to said source through said control means, a source of direct current for energizing said field winding, and means including a resonant circuit and a pliotron for controlling the current of said field winding in response to change in the frequency of the current delivered by said generator.

7. A speed regulating system comprising an alternator, a motor for driving said alternator, a source for supplying alternating current to said motor, means for controlling the voltage impressed on said motor by said source, a machine provided with a field winding and an armature winding conductively associated with said motor and connected to said source through said control means, a source of direct current for impressing a voltage on said field winding, and means including a resonant circuit for impressing on said field winding a voltage of a value dependent on the frequency of the current delivered by said generator.

In witness whereof, I have hereunto set my hand this 22nd day of March 1924.

CLARENCE W. HANSELL.